(12) United States Patent
Morero (10) Patent No.: US 8,886,055 B1
(45) Date of Patent: Nov. 11, 2014

(54) REDUCED DATA RATE OPERATION MODE FOR HIGH SPEED OPTICAL COMMUNICATION DEVICE

(75) Inventor: Damian Alfonso Morero, Cordoba (AR)

(73) Assignee: ClariPhy Communications, Inc., Irvine, CA (US)

( * ) Notice: Subject to any disclaimer, the term of this patent is extended or adjusted under 35 U.S.C. 154(b) by 0 days.

(21) Appl. No.: 13/479,147

(22) Filed: May 23, 2012

Related U.S. Application Data (60) Provisional application No. 61/489,537, filed on May 24, 2011.

(51) Int. Cl.
*H04B 10/04* (2006.01)
*H04B 10/06* (2006.01)
*H04B 10/12* (2006.01)

(52) U.S. Cl.
USPC ........................................ 398/192; 398/208

(58) Field of Classification Search
USPC .................. 398/183, 192, 198, 208
See application file for complete search history.

(56) References Cited

U.S. PATENT DOCUMENTS

| | | | |
|---|---|---|---|
| 6,618,176 B2 * | 9/2003 | Alexander et al. | 398/91 |
| 7,738,163 B2 * | 6/2010 | Bidmead et al. | 359/334 |
| 7,986,878 B2 * | 7/2011 | Saunders et al. | 398/26 |
| 8,351,798 B2 * | 1/2013 | Edirisinghe et al. | 398/193 |
| 2006/0115275 A1 * | 6/2006 | Kan et al. | 398/135 |
| 2007/0230966 A1 * | 10/2007 | Walsh | 398/155 |
| 2009/0148155 A1 * | 6/2009 | Latchman | 398/2 |
| 2011/0013911 A1 * | 1/2011 | Alexander et al. | 398/79 |

* cited by examiner

*Primary Examiner* — Dalzid Singh
(74) *Attorney, Agent, or Firm* — Fenwick & West LLP (57) ABSTRACT

An optical communication device (e.g., a transmitter, receiver, or transceiver) includes a control input for selecting between operating the optical communication device in a normal operation mode for communicating data according to a first data rate and operating the optical transmitter in a reduced data rate operation mode for communicating data according to a second data rate lower than the first data rate. The optical communication device includes a forward error correction encoder and/or decoder and a modulator and/or demodulator. When operating in the reduced data rate mode, data is re-formatted for compatibility with the same forward error correction scheme and modulation/demodulation scheme used in the normal data rate mode, thereby enabling the reduced data rate mode without significant architectural overhead.

14 Claims, 11 Drawing Sheets

REDUCED DATA RATE OPERATION MODE FOR HIGH SPEED OPTICAL COMMUNICATION DEVICE

RELATED APPLICATIONS

This application claims priority under 35 U.S.C. §119(e) to U.S. Provisional Patent Application Ser. No. 61/489,537 entitled "40 Gb/s Operation Modes 100 Gbps Receivers Based on QPSK and DQPSK Modulation" to Damian A. Morero, filed May 24, 2011, the content of which is incorporated by reference herein.

BACKGROUND

1. Field of the Art

The disclosure relates generally to communication systems, and more specific. IC reduced data rate operation mode for a high speed communication device.

2. Description of the Related Art

Optical fiber is widely used as a communications medium in high speed digital networks, including local area networks (LANs), storage area networks (SANs), and wide area networks (WANs). There has been a trend in optical transport networking towards ever-increasing data rates. In recent years, attention has shifted from 10 Gbps systems to 40 Gbps systems to 100 Gbps or faster systems. Due to the rapid progress in increasing data rates, potential compatibility issues can arise between a newer high-speed device 100 Gbps receiver) and lower speed (e.g., 40 Gbps) optical transport networks. Furthermore, operating at high data rates can sometimes cause increased noise degradation or distortion, thereby causing performance problems in such high speed devices.

SUMMARY

In a first aspect, an optical transmitter includes a control input for selecting between operating the optical transmitter in a normal operation mode for transmitting data according to a first data rate and operating the optical transmitter in a reduced data rate operation mode for transmitting data according to a second data rate lower than the first data rate. The optical transmitter includes a forward error correction encoder for encoding data to generate codewords and a modulator for generating a modulated signal from the codewords. The same forward error correction encoder and modulator (and in one embodiment, DSP and AFE) are used in both the normal operation mode and the reduced data rate operation mode.

In a second aspect, an optical receiver includes a control input for selecting between operating the optical receiver in a normal operation mode for receiving data according to a first data rate and operating the optical receiver in a reduced data rate operation mode for receiving data according to a second data rate lower than the first data rate. The optical receiver includes a demodulator for generating demodulated codewords from a modulated signal and a forward error correction decoder for decoding the demodulated codewords to generate recovered data blocks. The same forward error correction decoder and soft-demodulator (and in one embodiment, DSP and AFE) are used in both the normal operation mode and the reduced data rate operation mode.

Beneficially, the optical transmitter and receiver can therefore operate in a reduced data rate operation mode without requiring significant architectural overhead such as duplicate encoders/decoders, modulators DSP and AFE.

Other aspects of the invention include various combinations of the features described above, devices that use these combinations, systems based on these devices and methods related to any of the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

System Architecture

Figure 1:
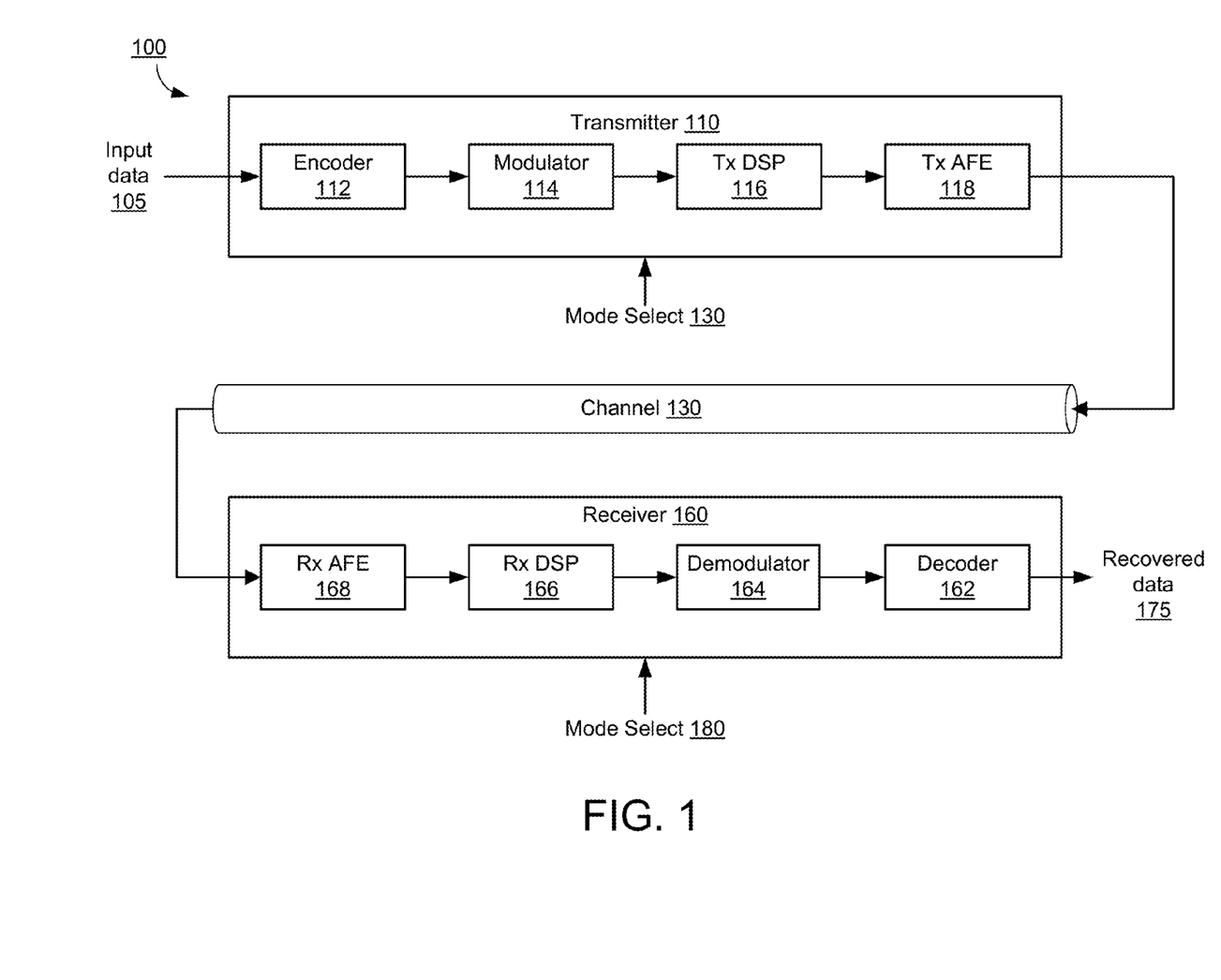
FIG. 1 is a high level block diagram of an embodiment of a communication system.

FIG. 1 is a block diagram of a communication system 100. The communication system 100 comprises a transmitter 110 for transmitting data to a receiver 160 via a communication channel 130. For example, in one embodiment, the communication system 100 comprises an optical fiber communication system capable of data rates of, for example, 100 Gbps and/or 40 Gbps.

The transmitter 110 comprises an encoder 112, a modulator 114, a transmitter (Tx) digital signal processor (DSP) 116, and Tx analog front end (AFE) 118. The encoder 112 receives input data 105 and encodes the data for transmission over the optical network. For example, in one embodiment, the encoder 112 encodes the input data 105 using forward error correction (FEC) codes that will enable the receiver 160 to detect, and in many cases, correct errors in the data received over the channel 130. In one embodiment, a block coding scheme is used in which each block of binary input data is mapped to an FEC codeword. Generally, the FEC code provides some redundancy in the data by incorporating extra data bits, thereby lengthening the data. For example, in one embodiment, the encoder 112 applies a transform function to an input data block having k bits to generate an FEC code having n bits, where n>k. This redundancy allows the receiver 160 to detect a limited number of errors that may occur in the transmitted data and in many cases to correct such errors.

The modulator 114 modulates the encoded data via one or more carrier signals for transmission over the channel 130. For example, in one embodiment, the modulator 114 applies phase-shift keying (PSK) or different phase-shift keying (DPSK) to the encoded data (e.g., using quadrature phase shift keying (QPSK), differential quadrature phase shift keying (DQPSK), binary phase shift keying (BPSK), or differential binary phase shift keying (DBPSK)). In these modulation methods, the modulator 114 formats the encoded digital bits into digital symbols suitable for transmission.

The Tx DSP 116 adapts (by filtering, etc.) the modulators output signal according to the channel characteristics in order to improve the overall performance of the transmitter 110. The Tx AFE 118 further processes and converts the Tx DSP's digital output signal to the analog domain before it is transmitted via the channel 130.

The transmitter 110 includes a mode select input 130 that configures the transmitter 110 according to one of a plurality of selectable modes. In one embodiment, the mode select 130 selects between at least first configuration suitable for transmitting data at a first data rate and a second configuration suitable for transmitting data at a second data rate. By providing the ability to select between configurations suitable for different data rates, the same transmitter 110 can support, for example, a high data rate mode (e.g., a 100 Gbps mode) for transmitting data at a high data rate (e.g., approximately 100 Gbps) and a reduced data rate mode (e.g., a 40 Gbps mode) for transmitting data at a reduced data rate (e.g., approximately 40 Gbps). In such a transmitter 110, operation in the high data rate mode may be desirable for maximum throughput. Furthermore, operation in the reduced data rate mode may be desirable to increase channel noise and distortion tolerance relative to the high data rate mode at the expense of the reduced data rate. Moreover, support for the different data rates can increase compatibility of the transmitter 110 with different types of optical transport networks configured for different data rates. Further details regarding configuration of the transmitter 110 in different operation modes are discussed below.

In addition to the illustrated components, the transmitter 110 may comprise other conventional features of a transmitter 110 which are omitted from FIG. 1 for clarity of description. Furthermore, in one embodiment, the transmitter 110 is embodied as a portion of a transceiver device that can both transmit and receive over the channel 130.

The channel 130 usually has a limited frequency bandwidth and may act as a filter on the transmitted data. Transmission over the channel 130 may add noise to the transmitted signal including various types of random disturbances arising from outside or within the communication system 100. Furthermore, the channel 130 may introduce fading and/or attenuation effects to the transmitted data. Based on these imperfections in the channel 130, the receiver 160 is designed to process the received data and recover the input data 105.

In general, the receiver 160 receives the encoded and modulated data from the transmitter 110 via the communication channel 130 and produces recovered data 175 representative of the input data 105. The receiver 160 includes an receiver (Rx) AFE 168, an RX DSP 166, a demodulator 164, and a decoder 162. The Rx AFE 168 receives the weak analog signal from the channel 130 and amplifies and preprocesses the signal to convert it to the digital domain. The Rx DSP 166 further processes the digital signal, by for example, applying one or more filters to improve signal quality.

The demodulator 164 receives the modulated signal from the Rx DSP 166 and demodulates the signal. The demodulator 164 may be a "hard-output demodulator" or a "soft-output demodulator." In a hard-output demodulator, the demodulator 164 converts the modulated symbols back to a bit sequence. In a soft-output demodulator, the demodulator 164 converts the modulated symbols to a sequence of the probabilities of each bit being a 1 or 0, or converts the modulated symbols to a sequence of the mathematical function of these probabilities. For example, a soft-output demodulator may convert the modulated symbols to the log-likelihood ratio (LLR) of each bit where the LLR of a bit is the logarithm of the ratio between the probability of this bit being a 1 and the probability of this bit being a 0, that is $LLR=\log(P(1)/P(0))$ where $P(1)$ is the probability that the hit is 1 and $P(0)=1-P(1)$. In one embodiment, the demodulator 164 applies phase-shift keying (PSK) or different phase-shift keying (DPSK) demodulation to the received signal (e.g., using quadrature phase shift keying (QPSK), differential quadrature phase shift keying (DQPSK), binary phase shift keying (BPSK), or differential binary phase shift keying (DBPSK)).

The demodulated signal may still have some errors due to channel noise or other filtering effects. The decoder 162 decodes the demodulated signal to attempt to detect and remove the errors using the redundant coding to recover the original input data 105. For example, in one embodiment, the decoder 162 applies a parity check matrix to a received FEC codeword having n symbols to remove the redundancy and to recover a data block having k symbols where n>k.

The receiver 160 includes a mode select input 180 that configures the receiver 160 according to one of a plurality of selectable modes. For example, in one embodiment, the mode select 180 chooses between at least first configuration suitable for receiving data at a first data rate and a second configuration suitable for receiving data at a second data rate. By providing the ability to select between configurations suitable for different data rates, the same receiver 160 can support, for example, a high data rate mode (e.g., a 100 Gbps mode) for receiving data at a high data rate (e.g., approximately 100 Gbps) and a reduced data rate mode (e.g., a 40 Gbps mode) for receiving data at a reduced data rate (e.g., approximately 40 Gbps). In such a receiver 160, operation in the high data rate mode may be desirable for maximum throughput. Furthermore, operation in the reduced data rate mode may be desirable to increase channel noise and distortion tolerance relative to the reduced data rate mode at the expense of the reduced data rate. Furthermore, support for the different data rates can increase compatibility of the receiver 160 with different types of optical transport networks. Further details regarding configuration of the receiver 160 in the different operation modes are discussed below.

In addition to the illustrated components, the receiver 160 may comprise other conventional features of a receiver 160 which are omitted from FIG. 1 for clarity of description. Furthermore, in one embodiment, the receiver 160 is embodied as a portion of a transceiver device that can both transmit and receive over the channel 130.

Components of the transmitter 110 and the receiver 160 described herein may be implemented, for example, as an integrated circuit (e.g., an Application-Specific Integrated Circuit (ASIC) or using a field-programmable gate array (FPGA), in software (e.g., loading program instructions to a processor (e.g., a digital signal processor (DSP)) from a computer-readable storage medium and executing the instructions by the processor), or by a combination of hardware and software.

Optical Communication Device with Reduced Data Rate Mode

In one embodiment, an optical communication device (e.g., a transmitter, receiver, or transceiver) can operate in one of a normal (high) data rate mode (e.g., 100 Gbps) and a reduced data rate mode (e.g., 40 Gbps). The optical communication device is generally designed to accommodate operation in the high data rate mode and generally has characteristics of devices designed to operate at the high data rate. For example, the optical communication device may be designed to utilize forward error correction (FEC) codes consistent with high data rate operation and modulate and/or demodulate data based on a QPSK or DQPSK in order to achieve the high data rates. Additionally, the optical communication device may operate with a symbol rate consistent with the high data rate mode (even when operating in the reduced data rate mode).

Nevertheless, the device can also be optionally configured to operate in a reduced data rate mode (e.g., a 40 Gbps mode) to increase compatibility with reduced data rate optical transport networks and/or to increase the channel noise and distortion tolerance. In one embodiment, the reduced data rate operation mode is designed to operate with only minimal changes to an existing architecture designed for normal (high data rate) operation. Thus, the underlying hardware and/or digital signal processing (DSP) program instructions designed for normal operation are largely re-used in the reduced data rate mode, thereby enabling the multiple modes with very little additional architectural overhead. For example, the device may operate with a symbol rate consistent with the high data rate mode, even when operating in the reduced data rate mode. Furthermore, the encoder (or decoder), modulator (or demodulator), DSPs, and AFEs designed for the high data rate operation can be used in the low data rate mode, without requiring a duplicate components for the different data rates.

Figure 2A:
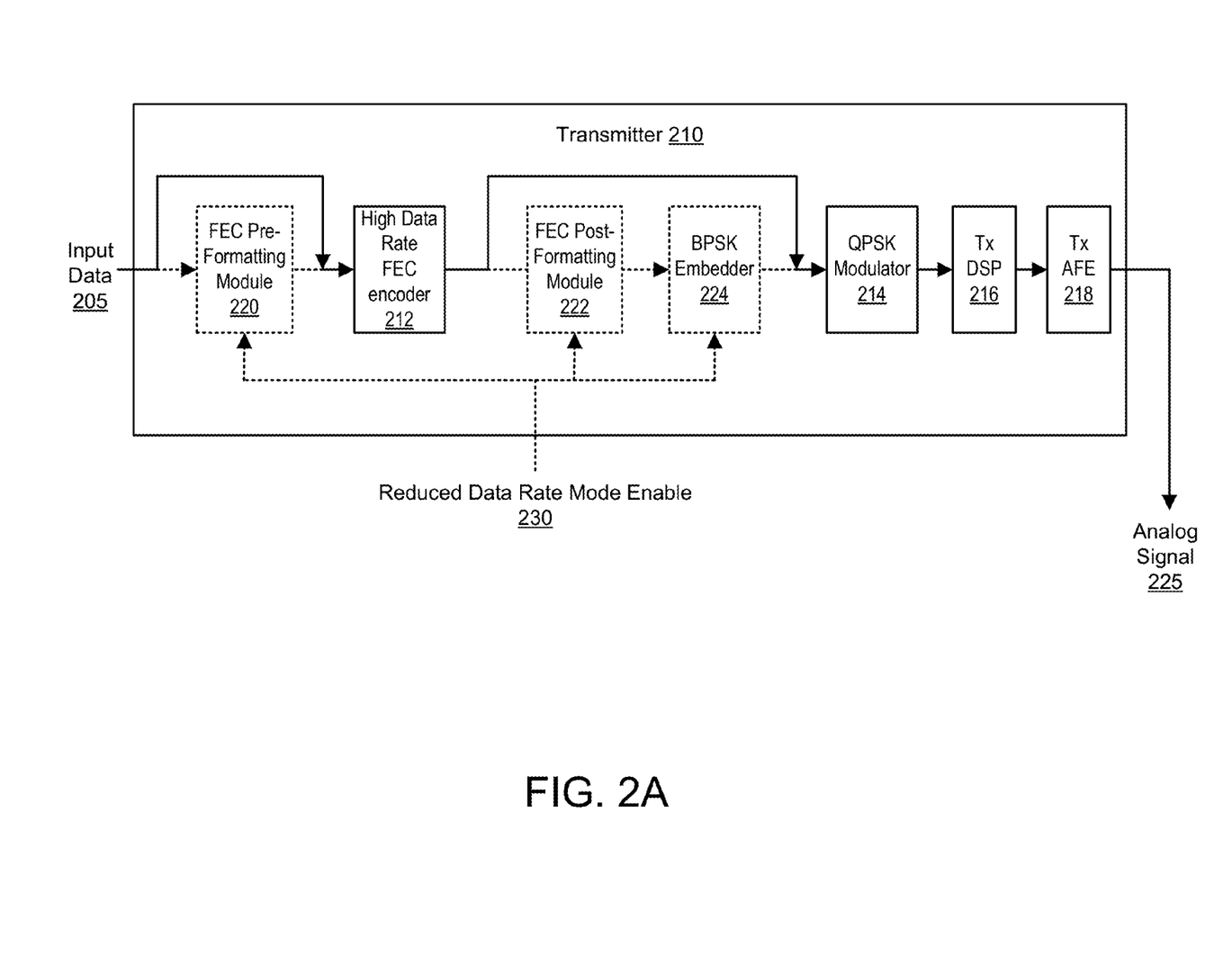
FIG. 2A is a block diagram of an embodiment of a transmitter having a reduced data rate mode.

FIG. 2A illustrates an example embodiment of a transmitter 210 capable of reduced data mode operation. The components and signal paths used in reduced data mode operation are indicated by the dashed lines. When operating in normal (high data rate) mode, these components are bypassed and the data follows the solid lines. Thus, in normal operation, input data 205 is encoded by a high data rate FEC encoder 212 as will be described in further detail below. The encoded data is then modulated by the QPSK modulator 214 using a QPSK modulation technique, and processed by the Tx DSP 216 and Tx APE 218 as described above to generate the analog signal 225.

When, the reduced data rate mode is enabled via control line 230, the input data 205 is first pre-formatted by an FEC pre-formatting module 220 so that the reduced rate input data will be compatible with the high data rate FEC encoder 212. Following FEC encoding (using the same FEC encoder 12 as in normal operation) the encoded data is post-formatted for reduced data rate transmission via, the FEC post-formatting module 222. Examples of techniques for pre-formatting and post-formatting are described in further detail below. Furthermore, when the reduced data rate mode is enabled, a BPSK embedder 224 embeds the encoded data into a QPSK constellation so that the reduced data rate signal can be modulated using the existing QPSK modulator 214 and processed using the same Tx DSP 216 and analog front end 218. Further details regarding the BPSK embedding process are described below.

Figure 2B:
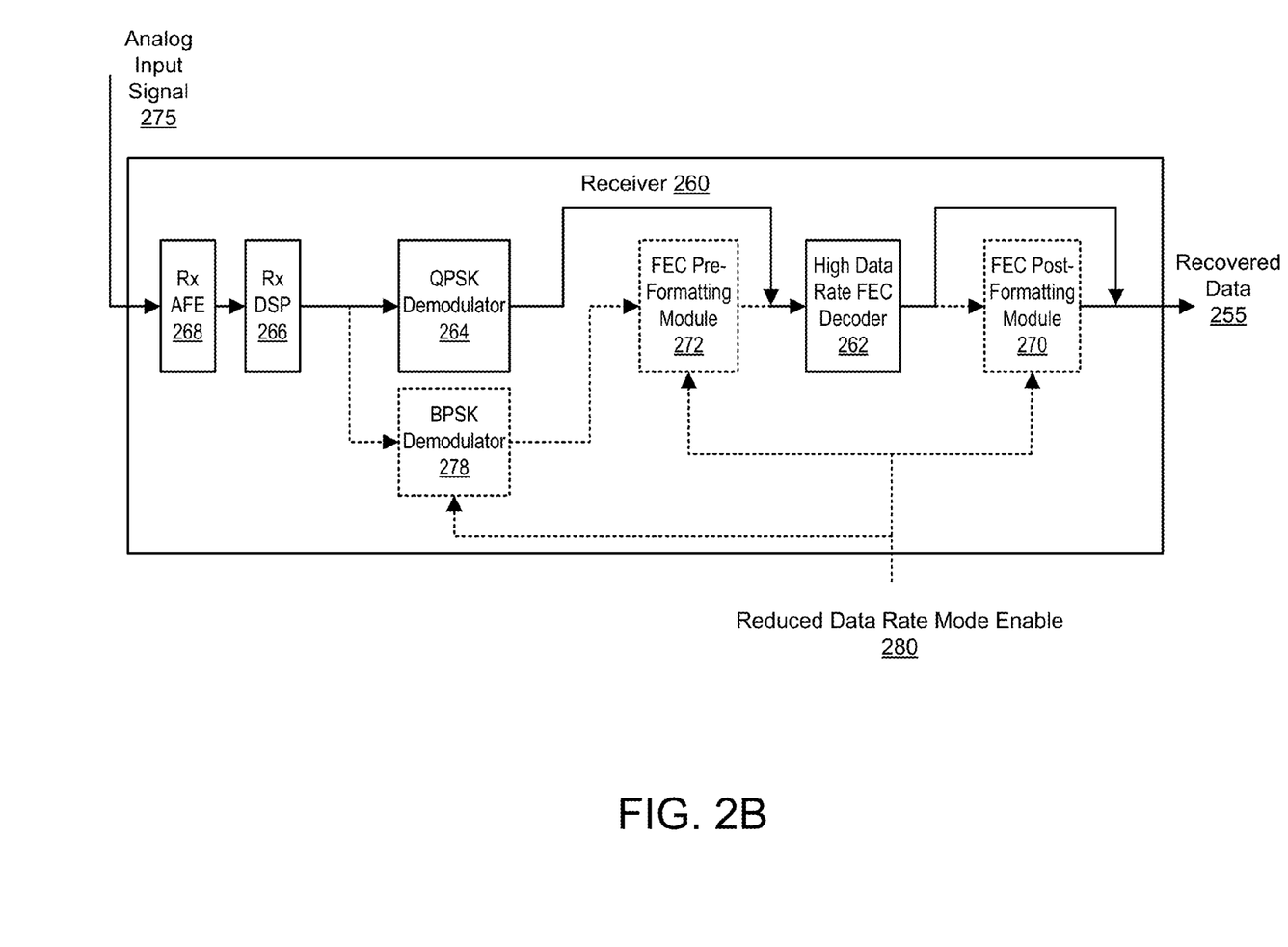
FIG. 2B is a block diagram of a first embodiment of a receiver having a reduced data rate mode.
Figure 2C:
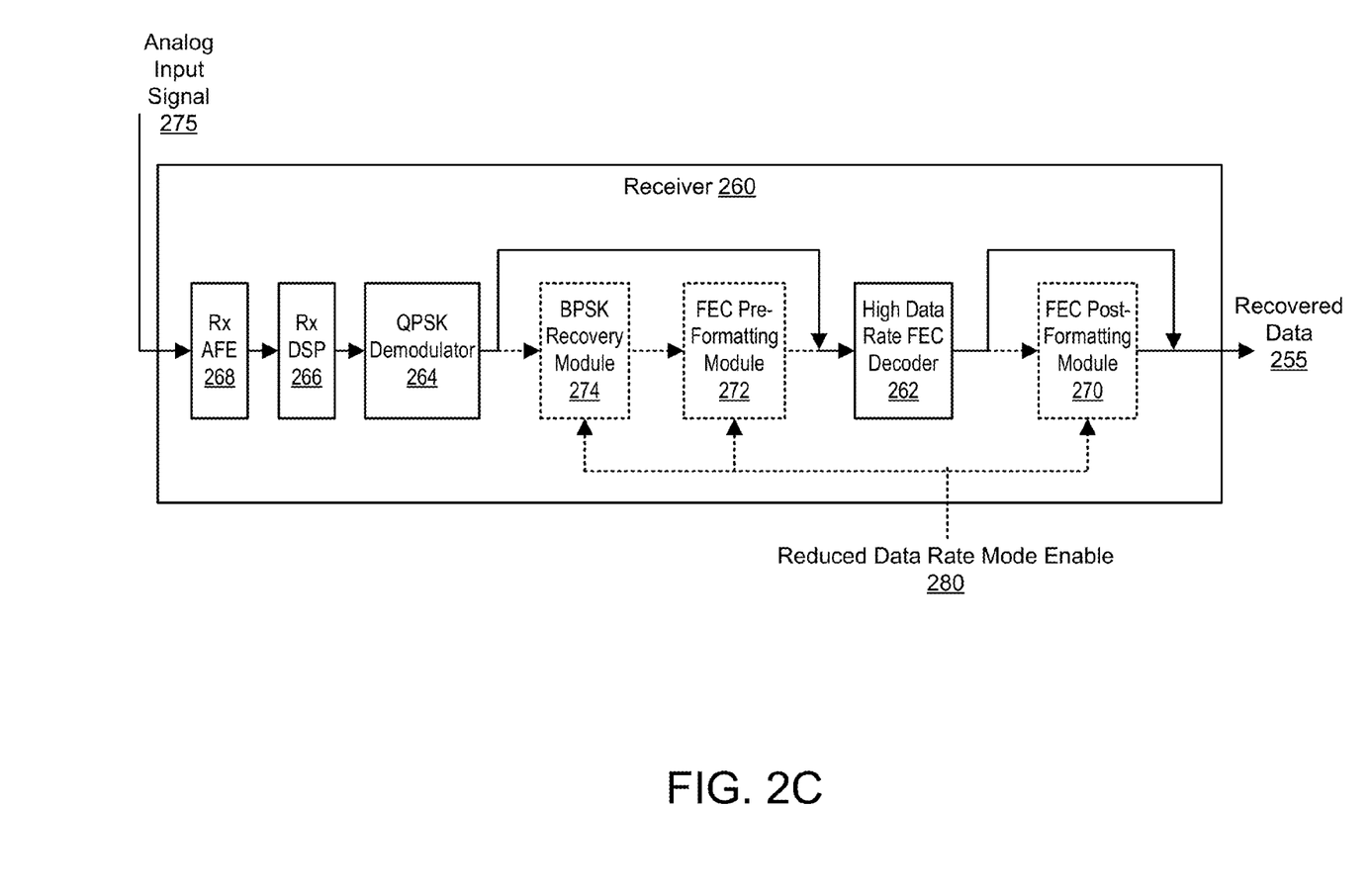
FIG. 2C is a block diagram of a second embodiment of a receiver having a reduced data rate mode.

FIGS. 2B and 2C illustrate example embodiments of a receiver 260 capable of reduced data mode operation. The components and signal paths used in reduced data mode operation are indicated by the dashed lines. When operating in normal (high data rate) mode, these components are bypassed and the data follows the solid lines. Thus, in normal operation, a received analog input signal 275 is processed by the Rx AFE 268 and Rx DSP 266 to produce a digital signal. The digital signal is demodulated by the QPSK demodulator 264 and then passed to the high data rate FEC decoder 262 for decoding.

In the example of FIG. 2B, the QPSK (hard or soft) demodulator 264 is replaced in the signal path by a BPSK (hard or soft) demodulator 278 when the reduced data rate mode is enabled via control line 280 (i.e., the QPSK demodulator 264 is bypassed in the reduced data rate mode). Furthermore, when the reduced data rate mode is enabled, a FEC pre-formatting module 272 first pre-formats the reduced data signal for compatibility with the high data rate FEC decoder 262 and an FEC post-formatting module 270 post-formats the decoded data following FEC decoding to recover the reduced data rate data.

In the alternative embodiment of FIG. 2C the QPSK modulator 264 is not bypassed in the low data rate mode. Instead, the QPSK demodulated data is further processed by BPSK recovery module 274 when in low data rate operation mode to recover BPSK data from the QPSK demodulated signal. Thus, in this embodiment, no duplicate output demodulator is needed. Note that in the embodiment of FIG. 2C, the QPSK modulator 264 is generally a soft demodulator. However, the architecture may still be used with a hard demodulator, although a performance degradation may result.

Thus, the transmitter 210 and receiver 260 beneficially enable a reduced data rate mode of operation by adding only a few simple components and without requiring duplicate modulators/soft-demodulators, encoders/decoders, AFEs, or DSPs. Specific examples of the additional processing performed by the transmitter 210 and receiver 260 for the reduced data rate mode are described in further detail below.

Modulation Technique for Normal Data Rate Mode

Figure 3:
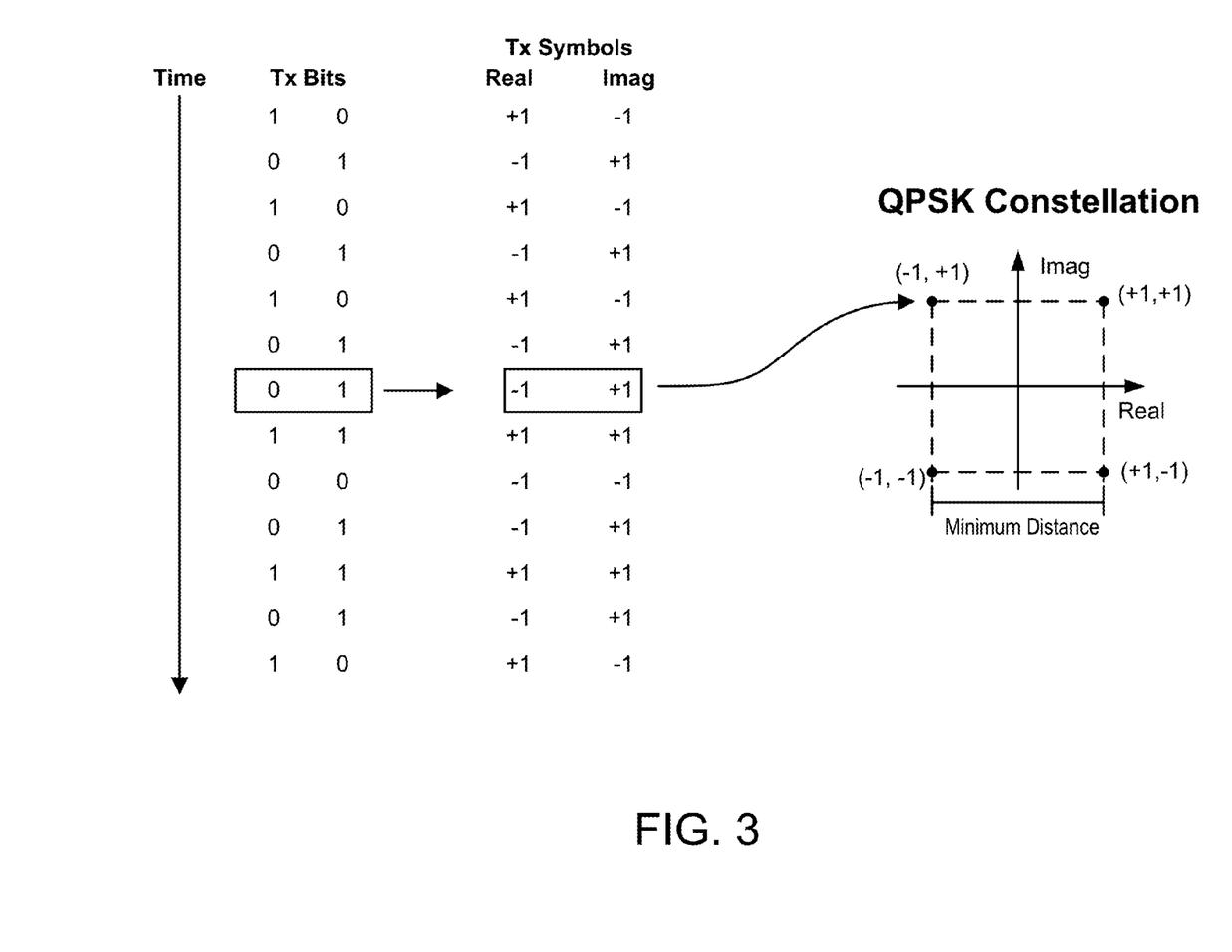
FIG. 3 is a diagram illustrating an example technique for QPSK modulation according to one embodiment.

In the normal mode, the optical communication device (e.g., transmitter 210 or receiver 260) utilize QPSK modulation/de-modulation. In QPSK modulation, data bits are represented by a discrete number of states. Specifically, in QPSK modulation these states are represented by symbols corresponding to four phases: typically 45°, 135°, 225°, and 315° although other variations may also apply. FIG. 3 illustrates an example mapping of bits to symbols in a QPSK constellation performed by QPSK modulator 214. QPSK modulator 214 receives a stream of Tx bits. Each two-bit sequence is mapped to a symbol on the complex plan, where, for example, 0s are mapped to −1 and 1s are mapped to +1, and where, for example, the first bit in the two-bit sequence is mapped to a position on the real axis and the second bit in the two-bit sequence is mapped to a position on the imaginary axis. For example, the sequence of bits 0, 1 is mapped to the symbol {−1, 1} on the complex plane. As can be seen, the QPSK constellation allows for four possible symbols (I, Q)={(−1, −1), (−1, 1), (1, −1), (1, 1)}, each corresponding to a different phase. The receiver 260, the QPSK demodulator 264 applies a reverse process. In the case of a "hard-output demodulator," the received symbols are mapped back to the corresponding bits. In the case of a "soft-output demodulator," the received symbols are instead mapped to a representation such as a sequence of the probabilities of each bit to be 1 or 0 or a sequence of the mathematical function of these probabilities as described above (e.g., an LLR as described above).

Modulation Technique for Reduced Data Rate Mode

Figure 4A:
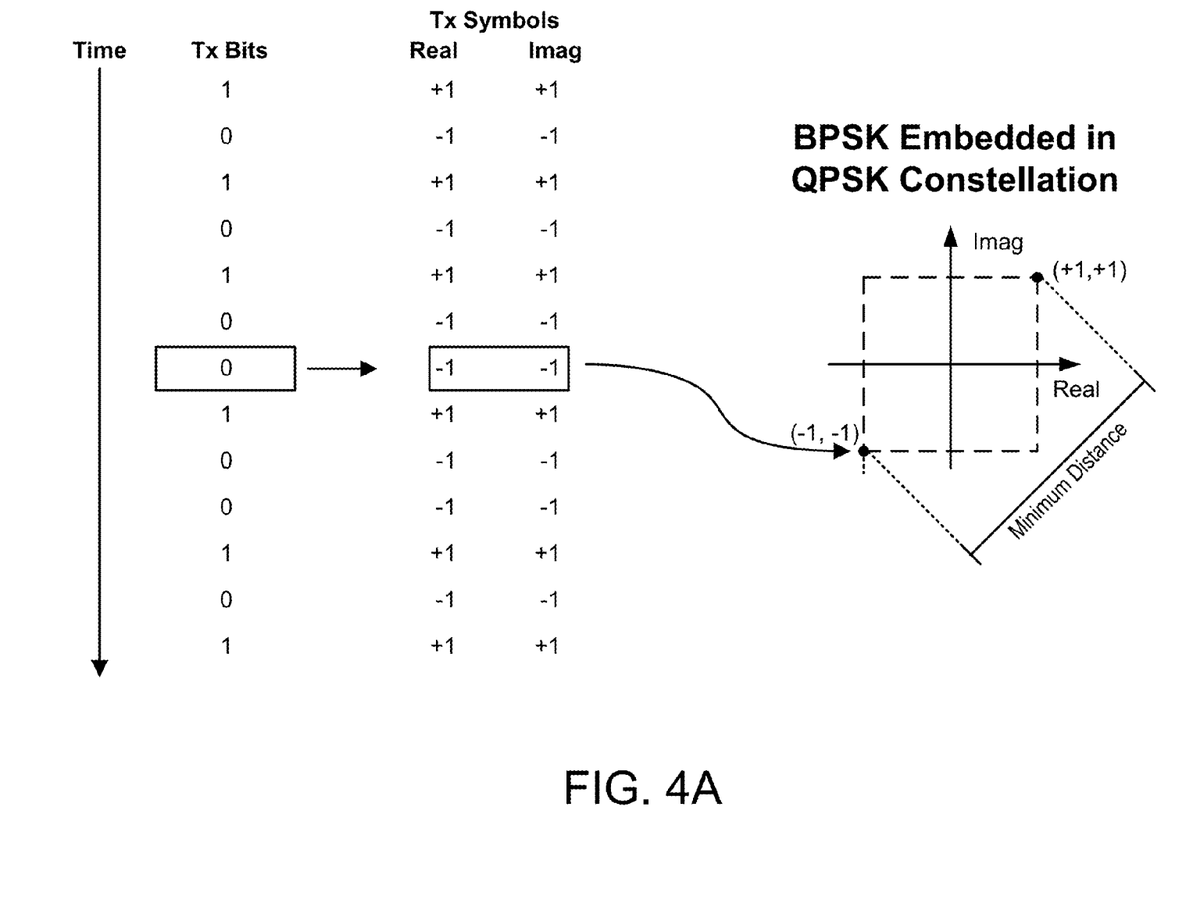
FIG. 4A is a diagram illustrating an example of a first technique for embedding binary phase shift keying (BPSK) into a quadrature phase shift keying (QPSK) constellation according to one embodiment.
Figure 4B:
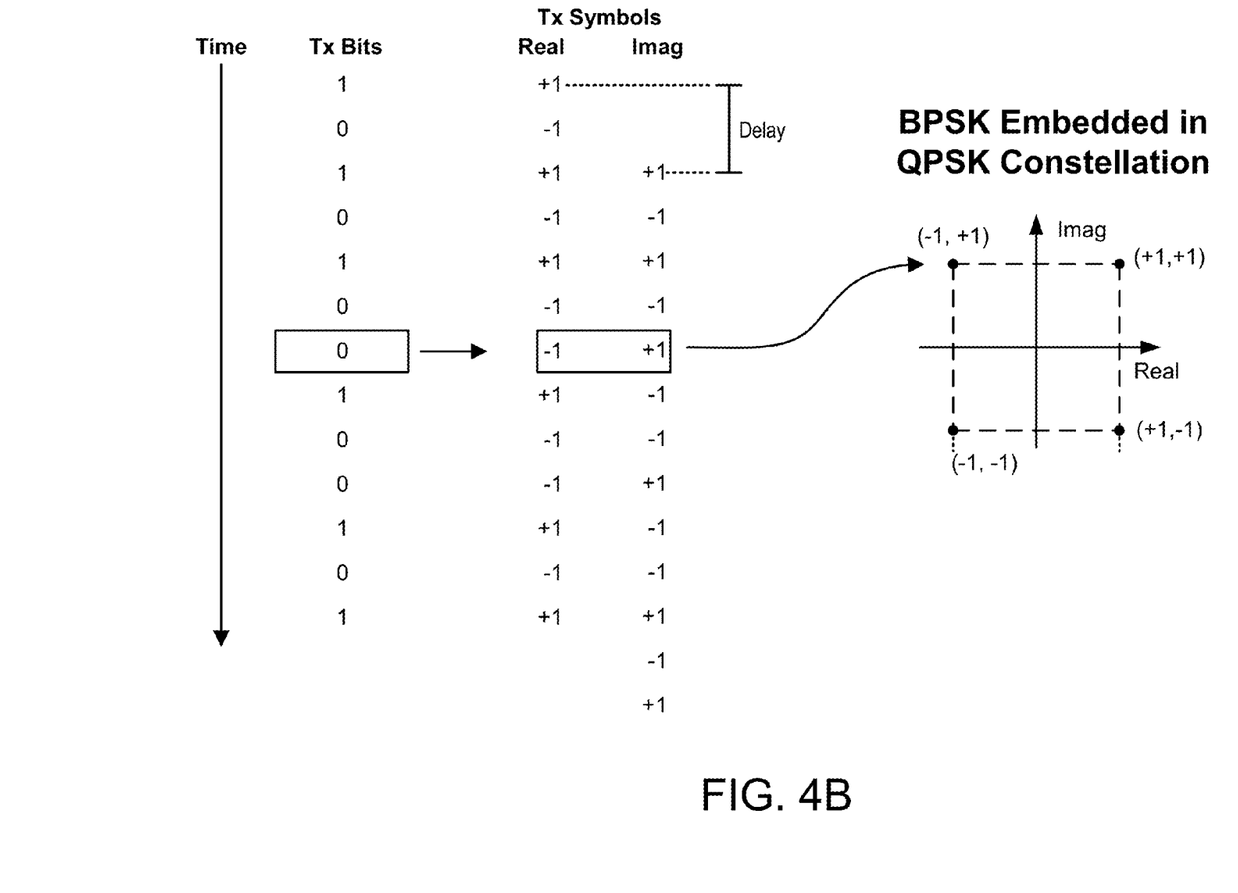
FIG. 4B is a diagram illustrating an example of a second technique for embedding binary phase shift keying (BPSK) into a quadrature phase shift keying (QPSK) constellation according to one embodiment.

In order to minimize changes to the optical communication device configured for QPSK (or DQPSK) modulation, a BPSK (or DBPSK) modulation can be embedded into the QPSK constellation. FIGS. 4A-B illustrate two different techniques for this embedding.

In FIG. 4A, BPSK is embedded into the QPSK constellation by using two opposite symbols of the available QPSK symbols. In BPSK, two symbols are used corresponding to two phases: typically 45° and 225°, although other variations are possible. For example, in the illustrated embodiment, the symbol set is limited to (I, Q)={(−1, −1), (+1, +1)}. Alternatively, the symbol set (I, Q)={(−1, +1), (+1, −1)} may be used. Thus, in the transmitter 210, the BPSK embedder 218 first formats each bit as a two-bit sequence, which are then mapped to the QPSK symbols by the QPSK modulator 220. For example, the BPSK embedder 218 may encode a 0 bit as a two-bit sequence (0, 0) which is then mapped to the symbol {−1, −1} by the QPSK modulator 220. Similarly, the BSPK embedder 218 may encode a 1 bit as a two-bit sequence (1, 1), which is then mapped to the symbol {+1, +1} by the QPSK modulator 220.

Alternatively, in one embodiment, the BPSK embedder 218 is omitted and the QPSK modulator 220 instead uses an alternative mapping in reduced data mode to directly map each bit to the QPSK symbol without the intermediate encoding step. (e.g., 0 is mapped directly to {−1, −1} and 1 is mapped directly to {+1, +1}).

A related process occurs in the receiver 260. For example, in the receiver architecture of FIG. 2C assuming a soft QPSK demodulator is used, the BPSK recovery module 274 re-encodes the QPSK data from the QPSK demodulator 270 prior to decoding. Thus, after the QPSK demodulator 270 maps each symbol to a two-element representations (e.g., a two-LLR sequence), the BPSK recovery module 274 re-encodes the two-element representation as a single element (e.g., two-LLR sequences as single LLRs). For example, a received symbol is demodulated to yield a two-LLR sequence (LLR1, LLR2) such that LLR1=log(P(b1=1)/P(b1=0)) and LLR2=log(P(b2=1)/P(b2=0)) where the bits b1 and b2 correspond to the real and imaginary parts of a QPSK symbol respectively, which is then encoded by the BPSK recovery module 274 as a LLR=log(P(b1=1,b2=1)/P(b1=0,b2=0)). Alternatively, a different mapping may be used. In an alternative implementation, the BPSK recovery module 274 is omitted and the QPSK demodulator 270 instead uses an alternative mapping in reduced data rate mode to directly map each QPSK symbol directly to a single bit, a single LLR, a single probability, or a function of the bit's probabilities without the intermediate encoding step (e.g., {−1} is mapped directly to 0 and {+1, +1}, is mapped directly to 1).

Alternatively, if the architecture of FIG. 2B is used, the BPSK demodulator 278 is active in the receiver 260 in place of the QPSK modulator 264. Here, the BPSK demodulator 278 demodulates the received symbols in the reduced data rate mode to map the symbols to a single bit, a single LLR, a single probability, or a function of the bit's probabilities.

A benefit of the embedding technique of FIG. 4A is that the minimum distance between symbols increases by a factor of √2 relative to QPSK modulation as can be seen by a comparison of the constellation diagrams in FIG. 4A and FIG. 3. This increased minimum distance results in approximately 3 dB of gain in the reduced data rate mode compared to the normal data rate mode when using the embedding technique of FIG. 4A. Furthermore, since the resulting modulation has 180 degrees symmetry (instead of the 90 degrees symmetry of QPSK) the phase noise tolerance is also improved.

In FIG. 4B, a variation of the BPSK embedding is illustrated. In this embodiment, each bit is mapped to one of two opposite QPSK symbols as in FIG. 4A. However, a delay in the imaginary (or real) part of the complex symbol is introduced before the symbol enters the Tx DSP 216. Thus, in this embodiment, all four QPSK symbols may actually be transmitted although they only contain the amount of information in BPSK symbols. The delay is compensated for in the receiver 260 after the received signal is processed by the Rx DSP 266 (i.e. before the QPSK demodulator 264), thus recovering the BPSK symbols and the original data bits. If the delay is long enough, the DSP and AFE will not be affected by the symbol correlation (i.e. the transmission of the same information in the real and imaginary part of the symbol). This embodiment may beneficially reduce any potential negative effects that the correlation may produce in the performance of the DSPs 216, 266 and the AFEs 218, 268.

Constant Symbol Rate Between Modes

In one embodiment, a constant symbol rate is maintained between both the normal operation mode and the reduced data rate mode so that the modulator/de-modulator, encoder/decoder, DSPs, and AFEs, can be used in both modes. Using the same DSP and AFE symbol rate in both the reduced data rate mode and the high data rate mode, the embedded BPSK modulation will reduce throughput by about 50% because it uses two-bit symbols to encode a single bits of information. However, if the reduced data mode is less than 50% of the normal data rate mode, the additional bandwidth can be used to support an increase in FEC overhead in the reduced data rate mode.

For example, in one embodiment the normal (high) data rate uses QPSK modulation and operates at 100 Gbps with 20% overhead, while the reduced data rate mode operates at 40 Gbps using the embedded BPSK modulation described above. To accommodate the normal mode, the QPSK modulator 214 maps bits to symbols at a symbol rate of $$10^{11} \cdot \frac{1.2}{2} = 6 \cdot 10^{10}$$

symbols per second. The Tx DSP 216 and Tx AFE 218 are similarly designed to process $6 \cdot 10^{10}$ symbols per second. For example, the Tx DSP 216 and Tx AFE 218 have a clock frequency and parallelism factor sufficient to support this symbol rate. To keep the symbol rate constant in both the normal mode and reduced data rate mode, the FEC overhead can be increased in the reduced data rate mode. For example, if a 50% overhead is used in the 40 Gbps mode, the symbol rate is given by $$4 \cdot 10^{10} \cdot \frac{1.5}{1} 6 \cdot 10^{10},$$

which results in the same symbol rate as in the normal mode. More generally, the overhead in the reduced data rate mode to match the symbol rate of the normal mode can be determined by the following equation:

$$\frac{1}{2}(1 + \Delta_H) \cdot H Gbps = (1 + \Delta_L) \cdot L Gbps$$

where H is the data rate in the normal mode, L is the data rate in the reduced data rate mode, $\Delta_H$ is the overhead in the high data rate mode and $\Delta_L$ is the overhead in the reduced data rate mode.

In other alternative embodiment, the symbol rate in the reduced data rate mode may be lower than in the normal operation mode.

Forward Error Correction Code for Reduced Data Mode

Figure 5:
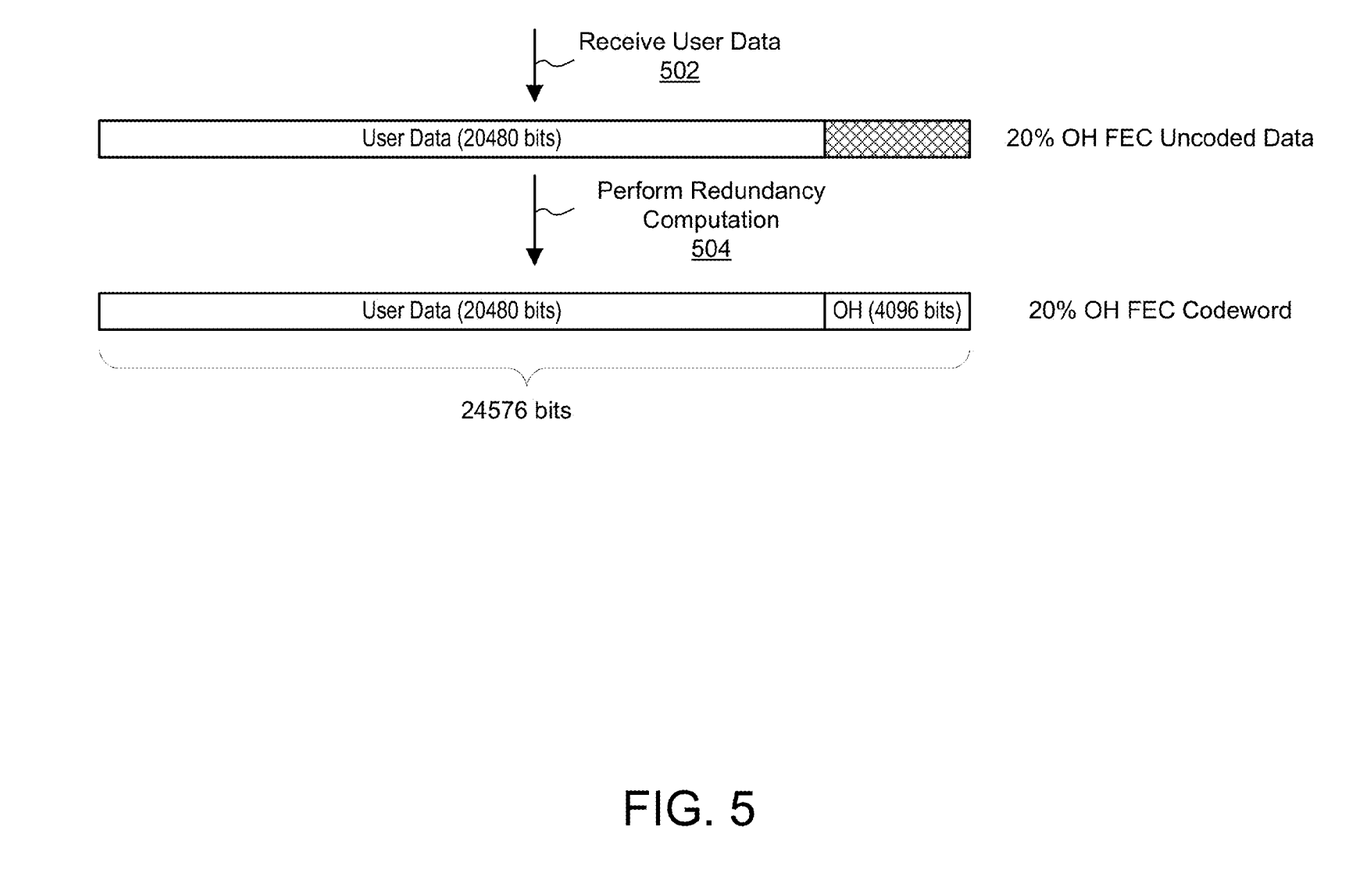
FIG. 5 is a diagram illustrating an example process of a forward error correction (FEC) encoding in a high data rate system according to one embodiment.
Figure 6A:
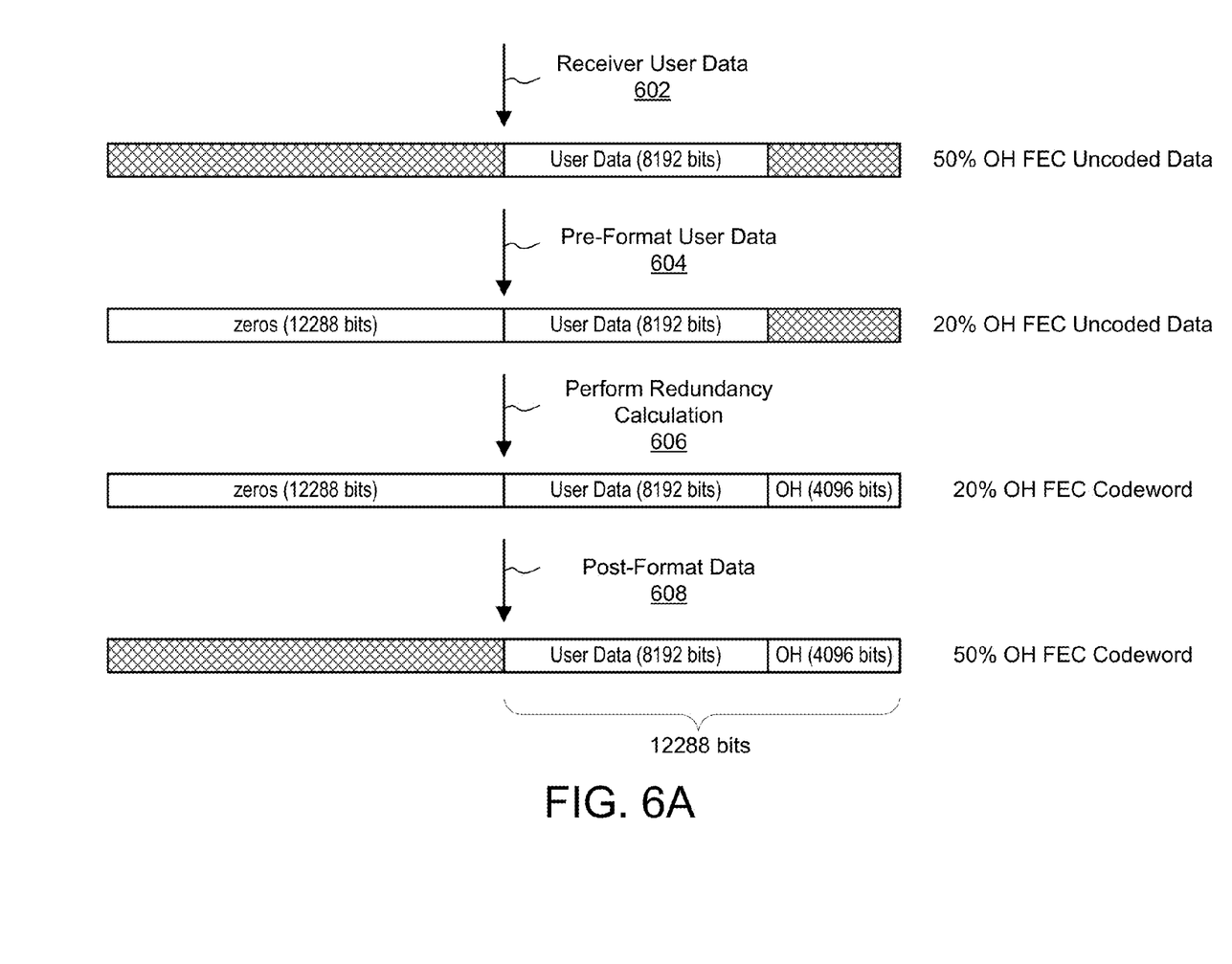
FIG. 6A is a diagram illustrating an example process of a FEC encoding in a reduced data rate mode according to one embodiment.
Figure 6B:
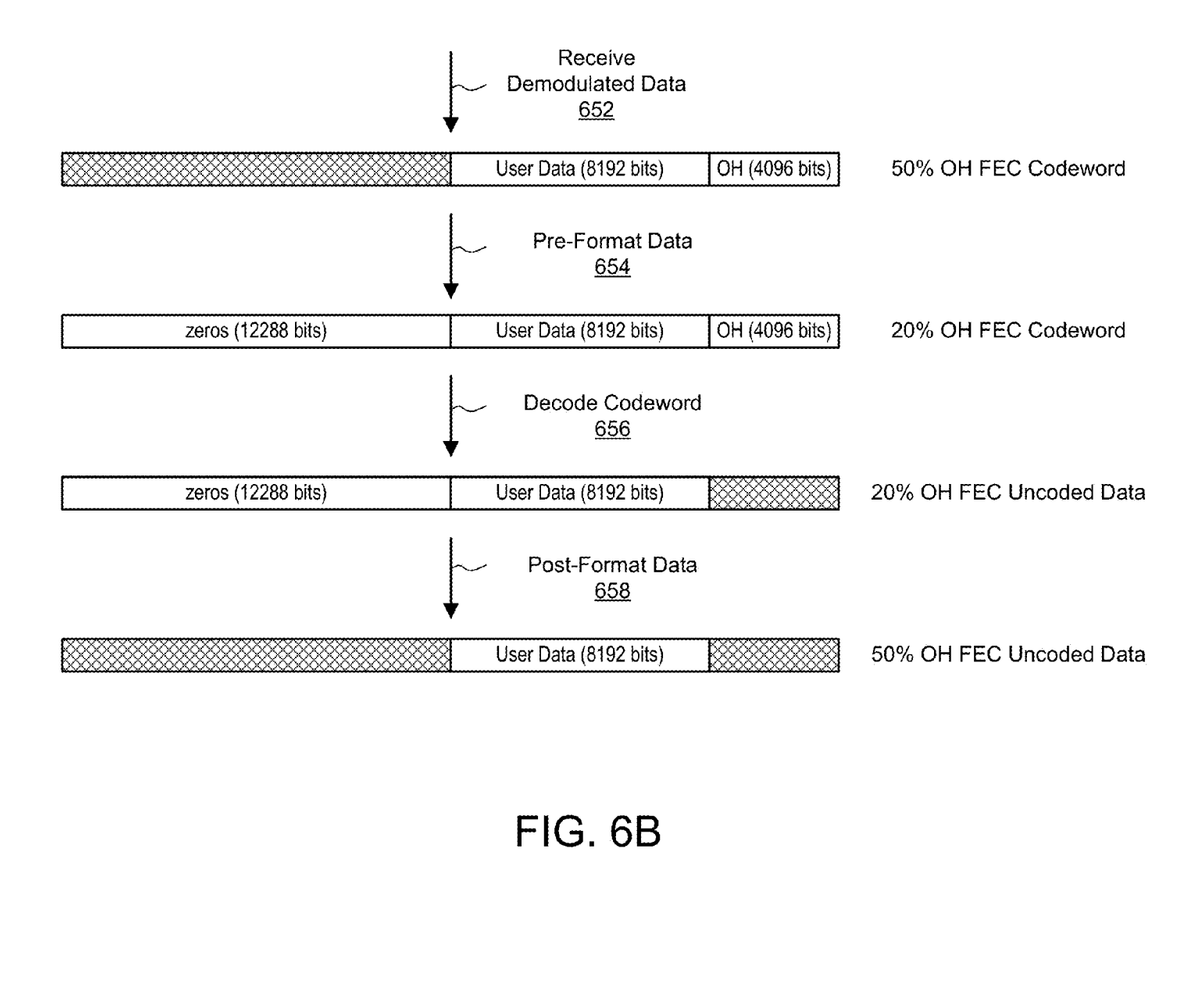
FIG. 6B is a diagram illustrating an example process of FEC decoding in a reduced data rate mode according to one embodiment.

FIGS. 5 and 6A-B illustrate examples of error correction encoding/decoding processes. In the example of FIG. 5, a transmitter 210 has a high data rate mode of 100 Gbps and is capable of operating in a reduced data rate mode of 40 Gbps. The high data rate FEC encoder 212 in this example receives 502 user data (e.g., 20480 bits of user data) for encoding. The high data rate FEC encoder 212 then performs 504 a redundancy computation a 20% redundancy computation) to generate the FEC codeword (e.g., a codeword with length 24576 bits of which 4096 represent overhead bits).

As described above, the low data rate mode can support higher FEC overheads than that of the normal (high) data rate mode without additional complexity. In one embodiment, when in the low data rate mode, the overhead is modified by shortening the code. For example, in one embodiment, a fraction γ of the systematic uncoded bits is set to a predetermined value (e.g., zeros) in the encoding and decoding process. These bits are not transmitted (or received) by the optical communication device.

When the reduced data rate mode is enabled, a shortened version of the code used is applied as illustrated in FIG. 6A. Here, because BPSK modulation is used in place of QPSK modulation in the reduced data rate mode, half as much information can be transmitted or received per second assuming the same symbol rate between the modes. Thus, based on the example described above, a 12288 bit code is used in the reduced data rate mode. To achieve 40 Gbps, using the same symbol rate, the code includes 8192 bits (40% of 20480 bits) of uncoded data, leaving 4096 bits available for overhead (50% OH) in the reduced data rate mode.

In the illustrated example, a transmitter 210 operating in reduced data rate mode receives 602 user data (e.g., 8192 bits of user data) for encoding. In order to achieve compatibility with the high data rate FEC encoder 212, the FEC pre-formatting module 220 pre-formats 604 the user data by adding additional dummy bits (e.g., 12788 bits) to the user data which are set to a predetermined value. For example, in the illustrated embodiment, these dummy bits are set to zeros, but alternatively they may be set to ones. This yields a total of 20480 uncoded bits, thus providing the same uncoded data length as in the normal mode. The same high data rate FEC encoder 212 can then be used to perform 606 the redundancy calculation for generating the FEC codeword (e.g., a codeword having length 24676 with 4096 overhead bits based on a 70% redundancy computation). Once the overhead bits are computed, the FEC post-formatting module 222 post-formats 608 the codeword by removing the dummy bits added by the pre formatting module 222. These dummy bits are not transmitted. The transmitted codeword in this example therefore includes 8192 bits of user data and 4096 overhead bits, yielding a 50% overhead. Note that the transmitted codeword in this example has a total of 12288 bits (half as many as in the high data rate example), thus enabling transmission via the same symbol rate as in the high data rate mode using the embedded BPSK modulation described above.

In the example of FIG. 6B, the process described above can be reversed in a receiver 260 having similar data rates and FEC parameters. A receiver 260 receives 652 demodulated data (e.g., a 12288 bit codeword). The FEC pre-formatting module 272 per-formats 654 the received codeword by adding additional dummy bits (e.g., 12288 dummy bits) to the received codeword that are set to a predetermined value (e.g., zeros). This yields an FEC codeword (e.g., a length 24676 codeword) that can be decoded according to the same decoding technique used in operation and using the same high data rate FEC decoder 262. The high data rate FEC decoder 262 decodes 656 the codeword to provide uncoded data (e.g., 20480 bits). Once decoded, the FEC post-formatting module 270 post-formats 658 the uncoded data to discard the dummy bits that were added by the pre-formatting module 272, leaving only the user data (e.g., 8192 bits of user data).

Performance Benefits of Reduced Data Mode

Figure 7:
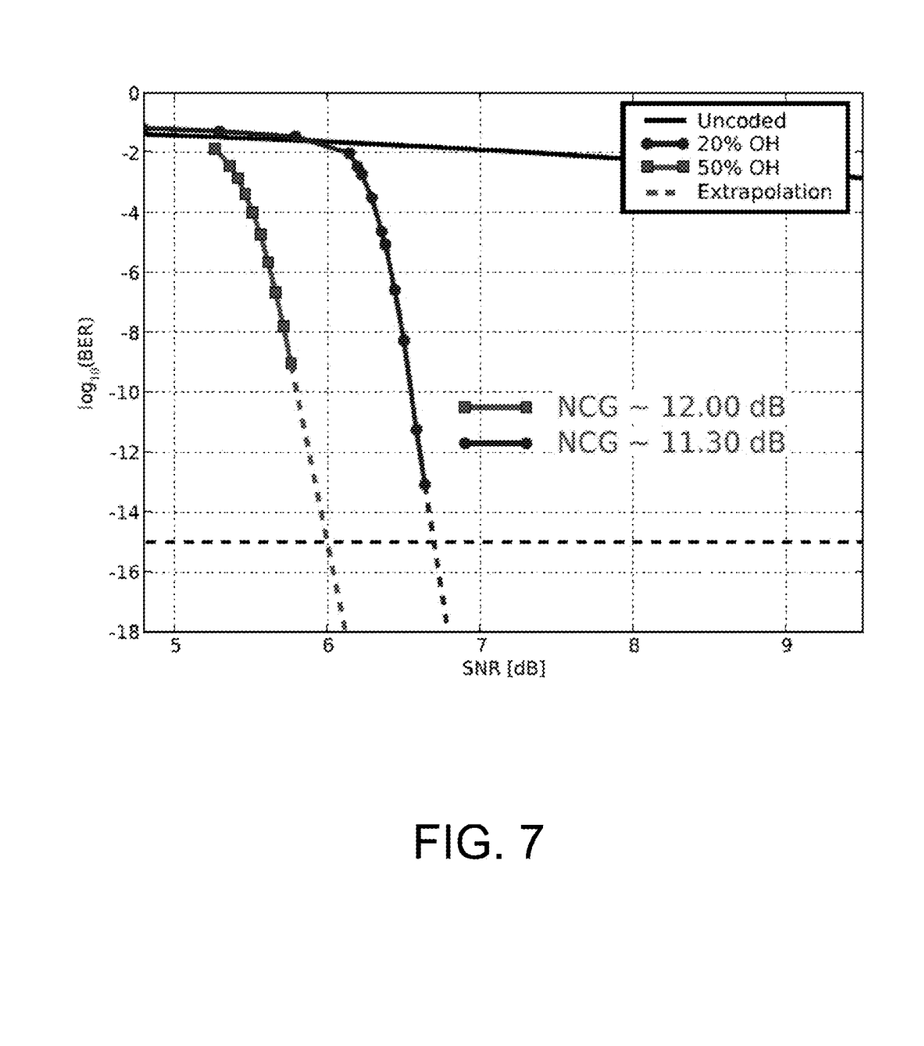
FIG. 7 is a graph illustrating a performance comparison between a normal (high) data rate operation mode and a reduced data rate operation mode according to one embodiment.

The increased overhead in the reduced data rate mode increases the net coding gain (NCG) of the communication device. For example, FIG. 7 illustrates a performance comparison for the encoding/decoding example describe above. The illustrated performance comparison does not include the 3 dB gain that can be achieved using the embedded BPSK modulation technique of FIG. 4A. As illustrated, the 20% OH FEC in the normal data rate mode has a NCG of 11.3 dB at a bit error rate (BER) of $10^{-15}$. In comparison, the 50% OH FEC in the reduced data rate mode has a NCG of 12.0 dB at a BER of $10^{-15}$. Thus, the reduced data rate mode in this example achieves an additional coding gain of 0.7 dB from the higher overhead.

In other alternative embodiment, the techniques described above can be applied to modes having different data rates besides those used in the examples. Furthermore, the techniques can be applied to systems having different error coding schemes and/or modulation techniques. For example, error correction using different codeword length, dimension, and overhead parameters may be used. Furthermore, wherever QPSK or BPSK is described above, the same techniques can be similarly applied using DQPSK or DBPSK modulation.

Although the detailed description contains many specifics, these should not be construed as limiting the scope of the invention but merely as illustrating different examples and aspects of the invention. It should be appreciated that the scope of the invention includes other embodiments not discussed in detail above. For example, the functionality has been described above as implemented primarily in electronic circuitry. This is not required, various functions can be performed by hardware, firmware, software, and/or combinations thereof. Depending on the form of the implementation, the "coupling" between different blocks may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not mean to be limited to a hardwired permanent connection between two components. In addition, there may be intervening elements. For example, when two elements are described as being coupled to each other, this does not imply that the elements are directly coupled to each other nor does it preclude the use of other elements between the two. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

The invention claimed is:

1. A method for operating an optical transmitter, the method comprising:
configuring the optical transmitter to operate in a normal operation mode for transmitting data according to a first data rate;
receiving a first input data block, encoding the first input data block using a forward error correction encoder to generate a first codeword, modulating the first codeword to generate a first modulated output signal, and transmitting the modulated output signal over a communication channel at the first data rate;
configuring the optical transmitter to operate in a reduced data rate operation mode for transmitting data according to a second data rate lower than the first data rate;
receiving a second input data block for transmission in the reduced data rate mode;
pre-formatting the second input data block by appending a plurality of dummy bits to generate an uncoded data block;
encoding the uncoded data block using the forward error correction encoder to generate a second codeword including the dummy bits, the second input data block, and a plurality of overhead bits;
post-formatting the second codeword to remove the dummy bits;
modulating the post-formatted second codeword to generate a second modulated output signal; and
transmitting the second modulated output signal over the communication channel.

2. The method of claim 1, further comprising:
mapping the second codeword generated by the forward error correction encoder when operating in the reduced data rate operation mode to a generate a symbol for each bit of the second codeword, wherein the symbol comprises one of two predetermined symbols of a quadrature phase shift keying (QPSK) constellation.

3. The method of claim 2, wherein the two predetermined symbols of the QPSK constellation comprise two symbols in the QPSK constellation having a maximum distance between them.

4. The method of claim 1, wherein the first data rate comprises approximately 100 Gbps and wherein the second data rate comprises approximately 40 Gbps.

5. An optical transmitter, comprising:
a control input for selecting between operating the optical transmitter in a normal operation mode for transmitting data according to a first data rate and operating the optical transmitter in a reduced data rate operation mode for transmitting data according to a second data rate lower than the first data rate;
a forward error correction encoder for encoding a first input data block to generate a first codeword when operating in the normal operation mode, and for encoding a pre-formatted data block to generate a second codeword when operating in the reduced data rate operation mode;
a modulator for generating a first modulated signal from the first codeword when operating in the normal operation mode and for generating a second modulated signal from the second codeword when operating in the reduced data rate operation mode;
a forward error correction pre-formatting module enabled in the reduced data rate operation mode and disabled in the normal operation mode, the forward error correction pre-formatting module configured to pre-format a second input data block by appending a plurality of dummy bits to generate the preformatted data block for encoding; and
a forward error correction post-formatting module enabled in the reduced data rate operation mode and disabled in the normal operation mode, the forward error correction post-formatting module configured to receive the second codeword from the forward error correction encoder and remove the dummy bits from the second codeword to generate a reduced data rate codeword.

6. The optical transmitter of claim 5, wherein the forward error correction encoder is configured to encode according to a symbol rate suitable for the first data rate in both the normal operation mode and the reduced data rate operation mode.

7. The optical transmitter of claim 5, wherein the modulator is configured to modulate according to a symbol rate suitable for the first data rate in both the normal operation mode and the reduced data rate operation mode.

8. The optical transmitter of claim 5, wherein the modulator comprises a QPSK modulator, the optical transmitter further comprising:
a BPSK embedder enabled in the reduced data rate operation mode and disabled in the normal operation mode, the BPSK embedder configured to map each bit of the second codeword generated by the forward error correction to a two-bit representation suitable for modulation by the QPSK modulator, wherein the two-bit representation corresponds to one of two predetermined symbols of a quadrature phase shift keying (QPSK) constellation.

9. A method for operating an optical receiver, the method comprising:
configuring the optical receiver to operate in a normal operation mode for receiving data according to a first data rate;
receiving a first modulated signal over a communication channel, demodulating the first modulated signal using a demodulator to generate a first demodulated codeword, and decoding the first demodulated codeword using a forward error correction decoder to generate a first recovered data block;
configuring the optical receiver to operate in a reduced data rate operation mode for receiving data according to a second data rate lower than the first data rate;
receiving a second modulated signal over the communication channel;
demodulating the second modulated signal using the demodulator to generate a second demodulated codeword;
pre-formatting the second demodulated codeword by appending a plurality of dummy bits to generate a second pre-formatted codeword;
decoding the second pre-formatted codeword using the forward error correction decoder to generate a second uncoded data block including the dummy bits and a recovered second data block;
post-formatting the second uncoded data block to remove the dummy bits; and
outputting the second recovered data block.

10. The method of claim 9, further comprising:
receiving the second demodulated codeword from the demodulator, wherein the demodulated codeword comprises a QPSK codeword; and
mapping each symbol of the QPSK codeword to a representation of the demodulated codeword, wherein the symbol comprises one of two predetermined symbols of a quadrature phase shift keying (QPSK) constellation.

11. An optical receiver, comprising:

a control input for selecting between operating the optical receiver in a normal operation mode for receiving data according to a first data rate and operating the optical receiver in a reduced data rate operation mode for receiving data according to a second data rate lower than the first data rate;

a demodulator for generating a first demodulated codeword from a first received input signal when operating in the normal operation mode, and for generating a second demodulated codeword from a second received input signal when operating in the reduced data rate operation mode;

a forward error correction decoder for decoding the first demodulated codeword to generate a first decoded data block when operating in the normal operation mode, and for decoding a preformatted demodulated codeword to generate a second decoded data block when operating in the reduced data rate operation mode;

a forward error correction pre-formatting module enabled in the reduced data rate operation mode and disabled in the normal operation mode, the forward error correction pre-formatting module configured to pre-format the second demodulated codeword by appending a plurality of dummy bits to generate the pre-formatted demodulated codeword for decoding by the forward error correction decoder; and a forward error correction post-formatting module enabled in the reduced data rate operation mode and disabled in the normal operation mode, the forward error correction post-formatting module configured to receive the second decoded data block from the forward error correction decoder and remove the dummy bits from second decoded data block to generate a reduced data rate data block.

12. The optical receiver of claim 11, wherein the forward error correction decoder is configured to decode according to a symbol rate suitable for the first data rate in both the normal operation mode and the reduced data rate operation mode.

13. The optical receiver of claim 11, wherein the demodulator is configured to demodulate according to a symbol rate suitable for the first data rate in both the normal operation mode and the reduced data rate operation mode.

14. The optical receiver of claim 11, wherein the demodulator comprises a QPSK demodulator and wherein the second demodulated codeword comprises a QPSK codeword, the optical receiver further comprising:

a BPSK recovery module enabled in the reduced data rate operation mode and disabled in the normal operation mode, the BPSK recovery module configured to receive the demodulated QPSK codeword and map each two-element sequence in the demodulated QPSK codeword to a single element, wherein the two-element sequence corresponds to one of two predetermined symbols of a quadrature phase shift keying (QPSK) constellation.

\* \* \* \* \*